US007655105B2

(12) United States Patent
Schmidt et al.

(10) Patent No.: US 7,655,105 B2
(45) Date of Patent: Feb. 2, 2010

(54) METHOD FOR EMBOSSING AIR-LAID WEBS USING LASER ENGRAVED HEATED EMBOSSING ROLLS

(75) Inventors: Bradley G. Schmidt, Green Bay, WI (US); James R. Vande Hey, De Pere, WI (US); James P. Zadrazil, Green Bay, WI (US); Edward J. Yock, Appleton, WI (US)

(73) Assignee: Georgia-Pacific Consumer Products LP, Atlanta, GA (US)

( * ) Notice: Subject to any disclaimer, the term of this patent is extended or adjusted under 35 U.S.C. 154(b) by 266 days.

(21) Appl. No.: 11/697,367

(22) Filed: Apr. 6, 2007

(65) Prior Publication Data
US 2007/0181243 A1 Aug. 9, 2007

Related U.S. Application Data

(63) Continuation of application No. 10/935,825, filed on Sep. 8, 2004, now Pat. No. 7,208,064, which is a continuation of application No. 09/562,302, filed on May 1, 2000, now Pat. No. 6,893,525.

(60) Provisional application No. 60/132,598, filed on May 5, 1999.

(51) Int. Cl.
*B29C 59/04* (2006.01)
*B27N 3/04* (2006.01)
(52) U.S. Cl. .............. 156/209; 264/119; 264/122; 264/128; 156/62.2
(58) Field of Classification Search ............ 264/109, 264/119, 122, 128; 156/62.2, 209, 219, 296; 101/16, 401.1
See application file for complete search history.

(56) References Cited

U.S. PATENT DOCUMENTS

| 728,828 | A | 5/1903 | Arkell |
| 1,808,536 | A | 6/1931 | Fisk |
| 1,820,338 | A | 8/1931 | Youngchild et al. |
| 2,788,003 | A | 4/1957 | Morin |
| D186,259 | S | 9/1959 | Howell |
| 2,943,560 | A | 7/1960 | Wrob et al. |
| 3,065,751 | A | 11/1962 | Gobbo et al. |
| 3,347,162 | A | 10/1967 | Braznell et al. |

(Continued)

FOREIGN PATENT DOCUMENTS

CA 2306605 A1 * 10/2000

(Continued)

OTHER PUBLICATIONS

Teletech, "Correlation Between Durometer A and P & J Hardness Scales," Feb. 14, 2001, pp. 1-3.*

*Primary Examiner*—José A Fortuna
(74) *Attorney, Agent, or Firm*—Joel T. Charlton

(57) ABSTRACT

A method of making an embossed air-laid absorbent sheet product includes depositing a dry web of fibers on a foraminous support; compacting the fiber web; embossing the compacted web with a laser-engraved roll with a hard rubber embossing surface, the hard rubber embossing surface having a plurality of sinuate bosses radially projecting circumferentially around the laser-engraved roll to provide the fiber web with a functional emboss pattern including a plurality of continuous sinuate compressed regions extending in a machine direction of the fiber web, the laser-engraved roll being heated to or maintained at a temperature of from about 100° F. to about 300° F.; and bonding the fiber web.

20 Claims, 2 Drawing Sheets

U.S. PATENT DOCUMENTS

| | | | |
|---|---|---|---|
| 3,425,347 A | 2/1969 | Nard | |
| 3,608,047 A | 9/1971 | Wiggins | |
| 3,672,950 A | 6/1972 | Murphy et al. | |
| 3,738,905 A | 6/1973 | Thomas | |
| 3,768,118 A | 10/1973 | Ruffo et al. | |
| 3,860,002 A | 1/1975 | Kolbach | |
| 3,879,257 A | 4/1975 | Gentile et al. | |
| 3,881,490 A | 5/1975 | Whitehead et al. | |
| 3,953,638 A | 4/1976 | Kemp | |
| RE29,789 E | 10/1978 | Kolbach | |
| 4,127,637 A * | 11/1978 | Pietreniak et al. | 264/119 |
| 4,154,883 A | 5/1979 | Elias | |
| 4,226,237 A | 10/1980 | Levesque | |
| 4,260,443 A | 4/1981 | Lindsay et al. | |
| 4,296,161 A | 10/1981 | Kaiser et al. | |
| 4,339,088 A | 7/1982 | Niedermeyer | |
| 4,437,917 A | 3/1984 | Tao et al. | |
| 4,476,078 A | 10/1984 | Tao | |
| 4,482,308 A | 11/1984 | Johnson | |
| 4,483,728 A | 11/1984 | Bauemfeind | |
| 4,544,596 A | 10/1985 | Holtman | |
| 4,612,231 A | 9/1986 | Bouchette et al. | |
| 4,614,679 A * | 9/1986 | Farrington et al. | 428/138 |
| 4,634,484 A | 1/1987 | Wagner | |
| 4,668,566 A | 5/1987 | Braun | |
| 4,699,618 A | 10/1987 | Sustmann | |
| 4,803,032 A | 2/1989 | Schulz | |
| 4,902,559 A | 2/1990 | Eschwey et al. | |
| 4,917,903 A | 4/1990 | Mente | |
| 5,128,082 A | 7/1992 | Makoui | |
| 5,173,351 A | 12/1992 | Ruppel et al. | |
| 5,215,617 A * | 6/1993 | Grupe | 156/209 |
| 5,246,772 A | 9/1993 | Manning | |
| 5,264,268 A | 11/1993 | Luceri et al. | |
| 5,269,983 A | 12/1993 | Schulz | |
| D352,833 S | 11/1994 | Schulz | |
| 5,429,630 A | 7/1995 | Beal et al. | |
| 5,510,143 A * | 4/1996 | Walsh et al. | 427/206 |
| 5,529,563 A * | 6/1996 | Veith et al. | 493/395 |
| 5,591,149 A | 1/1997 | Cree et al. | |
| 5,620,694 A | 4/1997 | Girardot | |
| 5,620,776 A * | 4/1997 | Schulz | 428/156 |
| 5,698,074 A | 12/1997 | Barcus et al. | |
| 5,727,458 A * | 3/1998 | Schulz | 101/24 |
| 5,743,999 A * | 4/1998 | Kamps et al. | 162/113 |
| 5,759,473 A | 6/1998 | Minke et al. | |
| 5,766,737 A | 6/1998 | Willey et al. | |
| 5,861,081 A | 1/1999 | Bredendick et al. | |
| 5,865,824 A | 2/1999 | Chen et al. | |
| 5,874,156 A | 2/1999 | Schulz | |
| 5,895,380 A | 4/1999 | Turi et al. | |
| 5,922,163 A | 7/1999 | Helynranta et al. | |
| 5,968,855 A | 10/1999 | Perdelwitz et al. | |
| 5,989,682 A | 11/1999 | Anderson | |
| 6,093,665 A | 7/2000 | Sayovitz et al. | |
| D434,913 S * | 12/2000 | Schmidt et al. | D5/53 |
| 6,173,496 B1 | 1/2001 | Makoui et al. | |
| 6,277,226 B1 * | 8/2001 | Schulz | 156/209 |
| 6,302,998 B1 * | 10/2001 | Burgess | 162/109 |
| 6,312,416 B1 | 11/2001 | Brisebois et al. | |
| 6,361,601 B1 * | 3/2002 | Schulz | 118/70 |
| 6,544,386 B1 | 4/2003 | Krzysik et al. | 162/123 |
| 6,893,525 B1 * | 5/2005 | Schmidt et al. | 156/209 |
| 7,195,810 B1 * | 3/2007 | Schmidt et al. | 428/156 |
| 7,208,064 B2 * | 4/2007 | Schmidt et al. | 156/209 |
| 2001/0008179 A1 * | 7/2001 | Oriarian et al. | 162/109 |
| 2002/0007749 A1 * | 1/2002 | Makoui et al. | 101/401.1 |
| 2005/0039846 A1 * | 2/2005 | Schmidt et al. | 156/209 |
| 2006/0137840 A1 * | 6/2006 | Burazin et al. | 162/109 |
| 2007/0126141 A1 * | 6/2007 | Schmidt et al. | 264/119 |
| 2007/0181243 A1 * | 8/2007 | Schmidt et al. | 156/209 |
| 2007/0283824 A1 * | 12/2007 | Braun et al. | 101/153 |
| 2008/0038515 A1 * | 2/2008 | Kershaw et al. | 428/152 |
| 2008/0066882 A1 * | 3/2008 | Schulz | 162/196 |
| 2008/0145620 A1 * | 6/2008 | Sahlberg et al. | 428/172 |

FOREIGN PATENT DOCUMENTS

EP          0810078 A1     12/1997

* cited by examiner

METHOD FOR EMBOSSING AIR-LAID WEBS USING LASER ENGRAVED HEATED EMBOSSING ROLLS

CROSS REFERENCE TO RELATED APPLICATIONS

This application is a continuation of U.S. application Ser. No. 10/935,825, filed Sep. 8, 2004, now U.S. Pat. No. 7,208,064, which is a continuation of U.S. application Ser. No. 09/562,302, filed May 1, 2000, now U.S. Pat. No. 6,893,525, which claims the benefit of U.S. Provisional Application Ser. No. 60/132,598, filed May 5, 1999. The priorities of the foregoing applications are hereby claimed and the entireties of their disclosures incorporated herein by reference.

TECHNICAL FIELD

The present invention relates generally to air-laid absorbent sheet and more particularly in preferred embodiments to a method of embossing air-laid absorbent sheet utilizing laser engraved, hard rubber, heated embossing rolls.

BACKGROUND ART

Air-laid absorbent sheet products are known in the art. U.S. Pat. No. 4,437,917 to Tao et al. describes a method for increasing the caliper and bulk of air-laid dry fibrous webs. The method generally includes measuring the downstream caliper of the bond curing drier and adjusting drier conditions on the basis of the caliper measurements.

U.S. Pat. No. 4,482,308 to Johnson teaches an apparatus for depositing dry fibers on a foraminous support including offset suction and air deflecting means for imparting a horizontal velocity to the fibers in the direction of the moving wire. The patent reports more uniform distribution of fibers in the product.

U.S. Pat. No. 4,476,078 to Tao describes that air-laid products are conventionally embossed either before or after the binder is applied and cured; each method having its advantages and drawbacks. Pre-embossing is reported to reduce line speed, while post-embossing lacks good embossing definition (col. 1, line 58-col. 2, line 13).

U.S. Pat. No. 4,612,231 of Bouchette et al. describes a pattern for an air-laid fibrous web of enhanced absorbency. According to the '231 patent, absorption rates are increased when at least about 40 percent of the imprinted area of the web is compressed (col. 2, lines 23-28).

Another method of increasing the absorbency of air-laid webs is disclosed in U.S. Pat. No. 5,128,082 to Makoui. The '082 patent describes making an absorbent structure by dry laying a fibrous web having incorporated therein a superabsorbent material such as poly(acrylic acid) or a salt thereof and applying a latex coating to at least one surface of the web.

Embossing cellulosic absorbent sheet products to alter their mechanical or tactile characteristics is likewise known. There is shown in U.S. Pat. No. 1,808,536 to Fisk a method and apparatus for embossing paper tissue and towels using an embossing roll with a wave-like pattern. The pattern on the roll has a relief height of 0.075 inches or more above the general surface of the roll (col. 2, lines 69-75). The method is reported to be particularly suitable for wet creped products prior to the web contacting the drier rolls.

U.S. Pat. No. D186,259 to Howell shows a puffed textile fabric with a wave-like design. So also U.S. Pat. No. 728,828 to Arkell shows a bidirectional wave pattern imposed on a paper structure.

U.S. Pat. No. 3,672,950 to Murphy et al. is directed to adhesively laminated crepe products wherein the plies are bonded in superposed relation by an adhesive disposed between the webs (col. 2, lines 15-25). The adhesive may be applied in a wave-like pattern in the machine direction (FIGS. 1, 4), while the webs may be embossed with a great number of pin-like embossments. The embossments extend from the body of the web for a predetermined distance as required to keep the two webs suitably spaced, the two webs being superposed with the protuberances of each web facing the other web (col. 4, lines 29-37; col. 6, line 74-col. 7, line 1).

In U.S. Pat. No. 4,339,088 to Niedermeyer there is described an embossing method to avoid nesting in convolutedly wound rolls wherein the repeat length is at least as great as the circumference of the roll. In Example 1, a sine wave pattern of embossment nodes is laid out in the machine direction (col. 4, lines 5-35).

U.S. Pat. No. 5,861,081 of Bredendick describes a single-ply paper towel with a plurality of infundibulate bosses formed therethrough. The towel has areas of light bosses and heavy boss perforations which form islands of heavy boss perforations surrounded by intersecting bands of light bosses (col. 3, lines 33-38).

Wave-like patterns have also been employed to control fluid distribution in absorbent structures. U.S. Pat. No. Re. 29,789 to Kolbach discloses a diaper with various embossed patterns. There is disclosed, for example, an embossed roll with circumferential wave bosses (46, FIG. 1) extending the cross direction of a production line. The diapers have compressed channels 72 with a wavy line profile which functions to direct fluid in the longitudinal direction (col. 7, lines 60-63; col. 8, lines 40-44).

U.S. Pat. No. 2,788,003 to Morin discloses a multi-layered diaper embossed with a wave-like pattern. The wave-like pattern is formed by embossing strips of the absorbent layer 17 against the facing sheet with a hot embossing tool. col. 3, lines 34-43. The embossed strips operate to convey fluid in the direction of the embossed lines. col. 4, lines 29-51.

U.S. Pat. No. 5,759,473 to Minke et al. describes a process for producing a silicone coated embossing roll for continuously embossing the surface of the thermoplastic film. A laser beam is used to cut into the smooth silicone rubber surface of the roll and pattern a design which replicates the negative of a leather grain. Embossed rolls described in the '473 patent are made by applying a smooth, silicone rubber coating to a steel roll. col. 2, lines 40-45.

There is described in U.S. Pat. No. 5,529,563 to Veith et al. a method of embossing between unmatched male and female embossing elements wherein one of the embossing rolls may be made of rubber. According to the '563 patent the material of the male and female embossing elements is preferably a deformable material such as rubber, plastic and the like. See col. 3, lines 53 to col. 4, line 20 for a general description of the process.

U.S. Pat. No. 5,269,983 to Schulz describes a method of embossing involving a mated pair of resilient and rigid embossing rolls. According to the '983 patent a laser can be utilized to form recesses in a resilient roll such that the resilient roll receives protuberances of a rigid male embossing roll when the rolls are placed in contact.

U.S. Pat. No. 4,634,484 to Wagner discloses a method of producing an embossing roll for the continuous embossing of the surface of a thermoplastic film. Sheets having desired grain patterns are mounted on a roller with edges abutting. Onto the surface of the grain pattern a silicone synthetic resin is applied as a uniformly thick coating with a coating knife as the roller rotates. The resin is hardened into a matrix and then peeled off the grain pattern. The matrix is placed with the pattern outward on a roller whose diameter pretty much matches the diameter of the embossing roll to be produced. The surface of a tubular thermoplastic film is embossed by contact with a cylindrical matrix under heat and pressure. The embossed surface of the thermoplastic film is once again embossed under heat and pressure in the areas along the abutting edges of the natural grain pattern on the roller so that an endless positive impression without seams in the grain pattern is produced. Another layer of silicone rubber is applied to the positive impression which layer is vulcanized into a matrix which is peeled off the positive form and then adhered to the circumferential surface of the embossing roll with the negative side out. With this embossing roller a natural leather grain can be embossed on a thermoplastic film without the appearance of discontinuities at the abutting edges.

U.S. Pat. No. 4,917,903 to Mente discloses an apparatus for producing decorative seams on films. The method involves using a die coated with a paste-like silicone rubber composition hardened and used to emboss a layer of plastic. See col 4, lines 49-56.

U.S. Pat. No. 2,943,560 to Wrob et al. discloses an embossing apparatus including an embossing clip with a flexible metal member to which is secured a lining of fabric and a molded embossing member preferably made of plastic, rubber or similar material. See Col. 3, lines 35-40.

U.S. Pat. No. 1,820,338 to Youngchild et al. discloses an embossing roll provided with a plurality of layers of hard rubber separated by layers of heavy fabric. The various layers are removable to expose successive hard rubber layers. See Col. 2, lines 78-83.

U.S. Pat. No. 3,425,347 to Nard discloses a printing plate including a rubber layer having an outer printing surface and an inner mating surface formed by a pattern of space uniform projections which relieve tension and provide concavity of the printing surface when a layer is mounted and adhesively secured to a curved backing roll.

U.S. Pat. No. 3,347,162 to Braznell et al. discloses rubber printing plates and a method of making them.

As can be seen from the foregoing rubber surfaces have been used for embossing, printing, and like processes. It is further noted, however, that patterned hard rubber rolls have not generally been applied to industrial processes for producing air-laid absorbent sheet where high speed, superior emboss definition, and wear considerations are paramount. In such applications steel rolls are generally still employed despite their higher manufacturing costs.

It has been found in accordance with the present invention that heated, hard rubber embossing rolls may be used to provide high quality emboss definition in air-laid webs. The inventive rolls and process of the current invention provide for more economical embossed rolls for air-laid products and also reduces the amount of time necessary to produce an embossed roll of a desired proprietary pattern.

SUMMARY OF THE INVENTION

There is provided in accordance with the present invention a method of making an embossed air-laid absorbent sheet product. The inventive process includes: a) depositing a dry web of fibers on a foraminous support; b) compacting the fiber web; c) embossing the compacted web with a laser engraved roll with a hard rubber embossing surface provided with an embossing pattern having a depth of from about 0.005 inch (5 mils) to about 0.125 inch (125 mils), the hard rubber embossing surface being biased toward a second embossing surface selected from the group consisting of the surface of a nip roll and a foraminous web support engaging a support roll; and d) bonding the fiber web.

A particularly preferred process of making an embossed air-laid absorbent sheet product in accordance with the invention includes the sequential steps of: a) depositing a dry web of fibers on a foraminous support; b) compacting the fiber web; c) embossing the compacted web with a laser engraved roll with a hard rubber embossing surface provided with an embossing pattern having a depth of from about 5 mils to about 125 mils, the hard rubber embossing surface being biased toward a second embossing surface selected from the group consisting of the surface of a nip roll and a foraminous web support engaging a support embossing roll; and d) bonding the fiber web. The steps of bonding and embossing may be reversed in a sequential process when thermal bonding is employed.

In a further aspect of the invention there is provided an absorbent sheet material including an air-laid fiber web provided with a functional emboss pattern comprising a plurality of continuous sinuate compressed regions in the air-laid web. The embossed pattern is imprinted on the air-laid web by way of a laser engraved roll with a hard rubber embossing surface provided with an embossing pattern having a depth of from about 5 mils to about 125 mils, the hard rubber embossing surface being biased to a second embossing surface selected from the group consisting of the surface of a nip roll and a foraminous web support engaging a support embossing roll.

BRIEF DESCRIPTION OF DRAWINGS

The invention is described in detail below with reference to the various figures in which.

DETAILED DESCRIPTION

Figure 1:
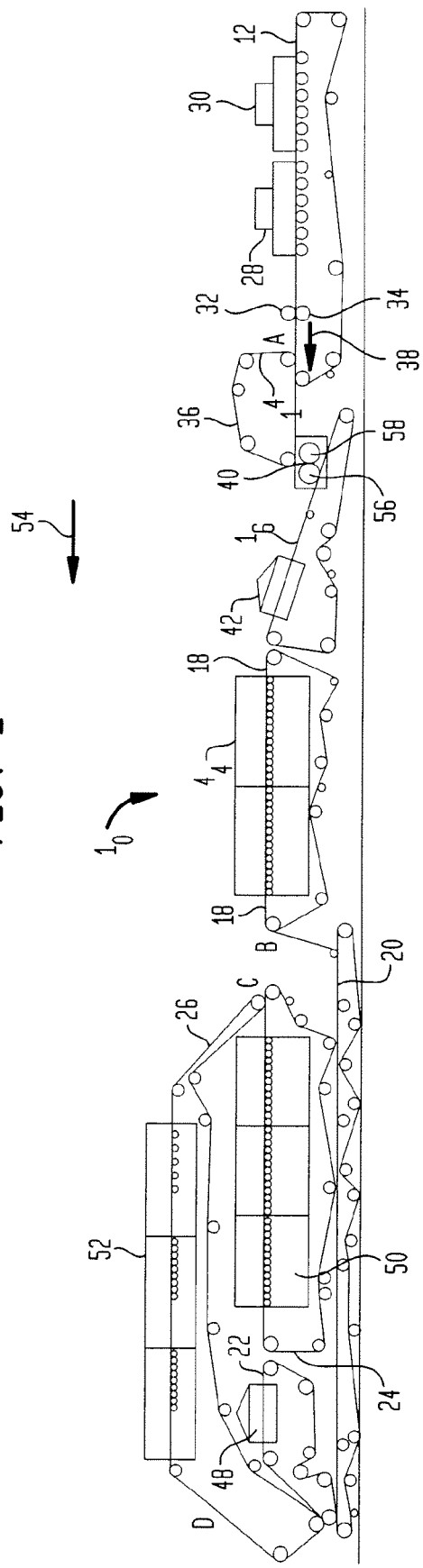
FIG. 1 is a schematic diagram illustrating the manufacture of an air-laid absorbent sheet product.

The invention is described in detail below for purposes of illustration and exemplification only. Various modifications will be readily apparent to those of skill in the art within the spirit and scope of the present invention which is set forth in the appended claims.

In general, the present invention is directed to a method of making an air-laid absorbent sheet embossed with a heated, hard rubber patterned roll. The process involves: a) depositing a dry web of fibers on a foraminous, that is, porous support; b) compacting the fiber web; c) embossing the compacted fiber web with a laser engraved roll with a hard rubber embossing surface provided with an embossing pattern having a depth of from about 5 mils to about 125 mils, the hard rubber embossing surface being biased toward a second embossing surface selected from the group consisting of the surface of a nip roll and a foraminous web support engaging a support embossing roll; and d) bonding the fiber web.

The step of bonding the fiber web includes, in some embodiments, both the steps of applying a polymer emulsion binder to the web and curing the binder. Typically, the binder is dried at a first temperature and then thermally cured at a second higher temperature as will become apparent from the discussion which follows. Most preferably, the step of applying binder to the web is subsequent to the step of embossing the compacted web. However, the step of applying binder to the web may, in some embodiments, be carried out prior to the step of embossing the web. The web may also be bonded using low melting point polymers, such as poly(ethylene), in the fiber web either in powder or fiber form. In general, any polymeric component with a melting or softening point less than about 250° F. or so is preferred. Bicomponent fibers with a low melting point component are particularly convenient. Low melting point polymers may be used alone or in combination with polymer emulsion binders as desired.

In cases where thermal bonding is used, a particularly preferred process may include the sequential steps of: a) depositing a dry web of fibers on a foraminous support; b)compacting the fiber web; c)bonding the fiber web; followed by d) embossing the compacted web with a laser-engraved roll with a hard rubber embossing surface provided with an embossing pattern having a depth of from about 5 mils to about 125 mils, the hard rubber embossing surface being biased toward a second embossing surface selected from the group consisting of the surface of a nip roll and a foraminous web support engaging a support embossing roll.

In particular applications of the process, the surface of the nip roll is selected from the group consisting of an unpatterned rubber surface having a hardness which is less than the hardness of the hard rubber surface of the laser engraved roll, a patterned rubber surface having a hardness which is less than the hardness of the hard rubber surface of the laser engraved roll, an unpatterned steel roll, and a patterned steel roll.

In general, the hard rubber, laser engraved surface, has a durometer hardness of from about 50 to about 100; with a durometer hardness of from about 75 to about 100 being typical. Most preferably the hard rubber, laser engraved surface has a durometer hardness of from about 85 to about 100.

The laser engraved embossing roll is typically heated to or maintained at a temperature from about 100° F. to about 300° F. A temperature of from about 200° to about 260° F. is more common especially with cellulosic fibers such as wood pulp fibers. The embossing rolls may be heated directly, for example, with steam, hot water, radiant heat or the like or may be placed in proximity to a dryer or oven where the process heat will maintain the temperature of the roll. In some cases, frictional heat may provide the necessary energy to maintain the desired temperature.

While an embossed pattern depth of from about 5 to about 125 mils may be employed, an embossing pattern on the roll with a depth of from about 10 to about 75 mils is more typical; while a depth of from about 15 to about 50 mils is preferred in some applications.

The laser engraved roll is suitably constructed having a steel roll core provided with a rubber sleeve with a thickness of from about 1/32 of an inch to about 1 inch in thickness. Most typically the thickness of the rubber sleeve on the laser engraved roll is from about 1/4 inch to about 3/4 inch. A thickness of about 1/2 of an inch is particularly preferred.

While the inventive method may be applied to a variety of air-laid absorbent sheet products, most typically these products have a basis weight of from about 25 to about 400 pounds per 3000 square foot ream. Most preferably, the embossed air-laid absorbent sheet product of the invention has a basis weight of from about 35 to about 150 pounds per 3000 square foot ream and consists essentially of cellulosic fibers. It is also possible to include synthetic fibers in the web. When synthetic fibers are employed, generally from about 5 to about 50% by weight of synthetic fiber based on the combined weight of synthetic fiber and cellulosic fiber is utilized. Most commonly, when synthetic fiber is employed it is used in the amount of from about 7.5 to about 15% by weight based on the combined weight of synthetic fiber and cellulosic fiber. Synthetic fibers employed may be selected from the group consisting of rayon fibers, polyethylene fibers, polypropylene fibers, polyethylene terephthalate fibers, nylon fibers and mixtures thereof. Polyethylene and polypropylene fibers are particularly preferred in some applications.

If additional bonding is desired, synthetic fibers with a relatively low melting point, or bicomponent fibers with a low melting point polymeric component may be included. Poly(ethylene) fibers or bicomponent fibers with a poly(ethylene) component are particularly useful.

It is also possible to include a superabsorbent polymer component in the air-laid sheet of the present invention since the sheet is typically used as part of an absorbent product. The superabsorbent polymer is usually employed in the form of powder, granules or fibers deposited during the process of initially forming the web on a foraminous support. However, a superabsorbent component may also be added during the step of applying binder to the web as should be apparent from the discussion which follows.

In a further aspect of the invention, there is provided an absorbent sheet material including an air-laid fiber web provided with a functional embossed pattern comprising a plurality of continuous sinuate compressed regions in the air-laid web. The embossed pattern is imprinted on the web by way of a laser engraved roll with a hard rubber embossing surface provided with an embossing pattern having a depth of from about 5 mils to about 125 mils, the hard rubber embossing surface being biased toward a second embossing surface selected from the group consisting of the surface of a nip roll and a foraminous web support engaging a support embossing roll. The functional embossed pattern is preferably generally sinosoidal and is applied in the machine direction of an air-laid web by an embossing roll with a plurality of continuous radially projecting bosses extending about the circumference of the embossing roll. In general, the plurality of continuous sinuate compressed regions have a width of from about 0.007 inches to about 0.060 inches. More preferably, the sinuate compressed regions have a width of from about 0.015 inches to about 0.035 inches with a width of about 0.025 inches being particularly preferred. Absorbent material provided with a plurality of sinuate compressed embossed regions usually has the embossed regions spaced at a distance from one another of from about 0.1 inches to about 1.0 inches. More typically, the regions are spaced from one another at a distance of from about 0.2 to about 0.5 inches. A spacing between sinuate lines of about 0.3 inches is particularly preferred in one embodiment. The embossed pattern on the sheet, whether sinuate or otherwise, is prepared by employing a corresponding boss on the laser engraved roll having a relief height of from about 0.005 to about 0.125 inch (5-125 mils). A boss height of from about 0.015 inches to about 0.075 inches is preferred whereas a boss height range from about 0.025 inches to about 0.050 inches is particularly preferred.

When a sinuate pattern as further shown and described herein is employed the sinuate compressed regions typically have a wave amplitude of from about 1 mil to about 8 millimeters. An amplitude of from about 2 millimeters to about 5 millimeters is preferred; whereas a wave amplitude of about 3.5 millimeters is especially preferred in some embodiments. Also, when a sinuate pattern is used, the compressed regions in the sheet have a repeat frequency from about 0.5 to about 4 wave crests per inch. A repeat frequency of the wave crest of from about 1 to about 3 crests per inch is typically preferred; with a repeat frequency of about 2 crests per inch being particularly preferred in some applications. These and other features will be further appreciated by considering the following description and drawings provided herewith.

A continuous air-laid web in accordance with the present invention is manufactured on a high speed manufacturing line as are well known in the art. There is shown schematically in FIG. 1 a continuous manufacturing line, known as an air-laid machine available from M&J or Dan Web Forming of Denmark. Web processing is typically pneumatically assisted in this type of apparatus as is likewise well known in the art. Generally, processes for producing and embossing air-laid webs appear in U.S. Pat. Nos. 4,437,917; 4,482,308; 4,476,078; 4,612,231; 5,128,082, the disclosures of which are incorporated herein by reference.

Figure 3:
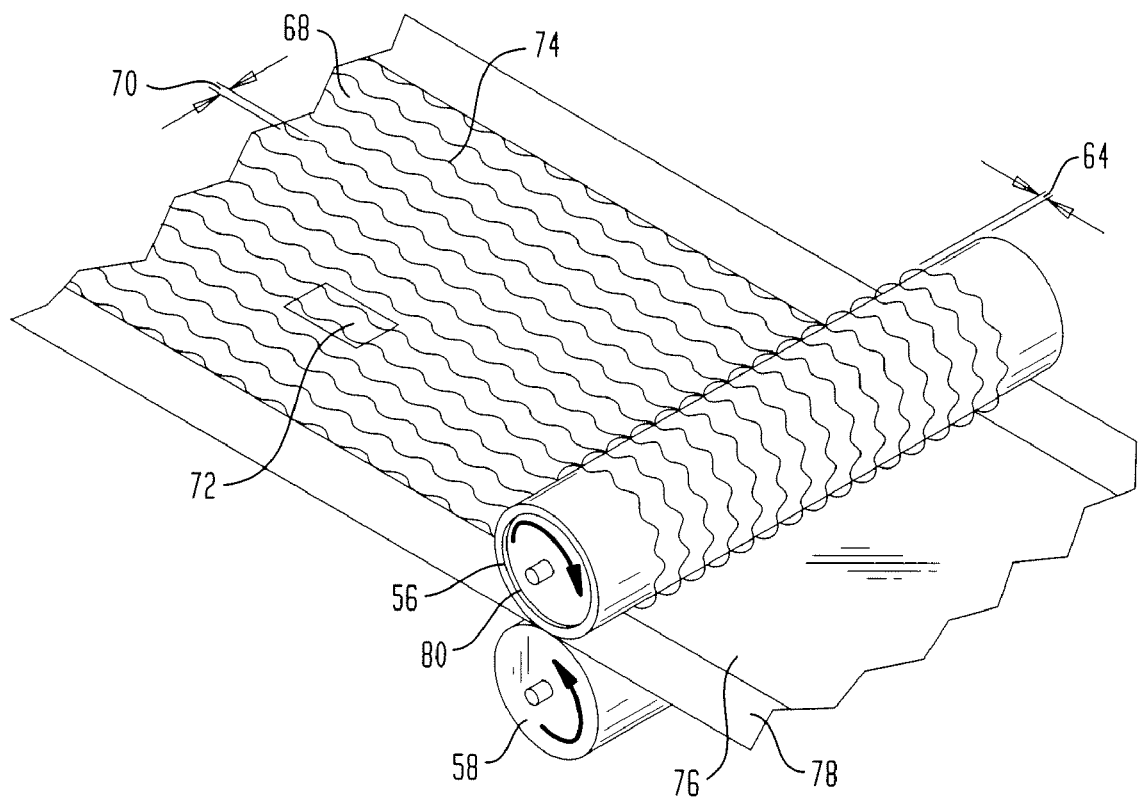
FIG. 3 illustrates roll to wire embossing of an air-laid absorbent sheet in accordance with the present invention.

Apparatus 10 of FIG. 1 includes a plurality of conveyor wires or fabrics, conveyor wires 12, 14, 16, 18, 20, 22, 24 and 26 which are foraminous (that is porous) supports for the product as it is manufactured in the various steps. The foraminous supports may be metal screens or porous fabric as so desired. Wire 12, the forming wire, is located underneath a pair of fiber distributors 28, 30 which deposit a fibrous web onto forming wire 12 typically under suction provided to the under side of the wire. The web is then conveyed to a pair of compacting rolls 32, 34 which are smooth surfaced and only slightly loaded in order to compact the web and provide it with some modicum of strength. If so desired, a pair of embossing rolls (not shown) could be disposed as indicated at A if it were desired to emboss the web at this point in the process. At A it would be convenient to perform roll to wire embossing, that is, employ a pattern roll as a top roll and utilize a support roll under the wire as is shown in FIG. 3. Embossing rolls are typically heavily loaded or biased towards each other and the pattern roll is preferably heated or maintained at an elevated temperature as noted above in order to impress a pattern on the fabric.

Figure 2:
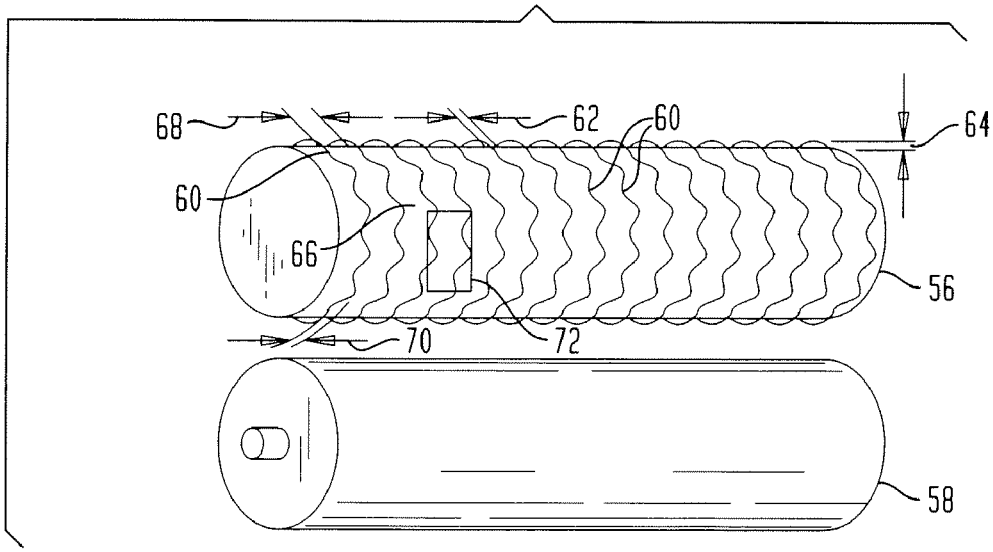
FIG. 2 is a schematic view in perspective of a pair of embossing rolls which may be utilized in the apparatus of FIG. 1.

After compaction the web is transferred to a web transfer section indicated at 36 where the web is transferred upwardly onto wire 14 as indicated by arrow 38 and eventually downwardly to an emboss section 40. In section 40 it is convenient to employ roll to roll embossing as is generally illustrated in FIG. 2, before the web is transferred to a third conveyor wire 16. Wire 16 transports the web to a spray cabin 42 where a binder, typically a latex binder, is sprayed onto the web. Thereafter, the web is transferred to a fourth conveyor wire, 18, and fed to a dryer, 44. Typically the first application of binder is about 5-10 weight percent based on the weight of dry fiber and dry binder, that is, solids content of the binder. After drying it would be convenient to emboss the continuous web with roll to roll embossing at location B, however, it has been found that embossing in accordance with the present invention is generally more effective prior to the application of binder.

The web is transferred from wire 18 to wire 20 where the web is conveyed to wire 22 which transports the web to a spray cabin 48 where binder is applied to the other side of the web which was adjacent to wire in spray cabin 42. During the second application of binder typically about 5-10 percent binder is applied to the web based on the web of dry fiber and dry binder material. It should be noted that while fiber is referred to as "dry", it will be understood by those who are skilled in the art that fiber as supplied to the manufacturing process typically includes a few percent moisture.

When a polymeric emulsion binder is used, it is typical to apply anywhere from about 5 to about 35 weight percent of binder, based on the weight of dry binder and dry fiber. From about 10 to about 30 percent binder is more typical, with about 15 to about 25 percent binder being even more typical.

Following the second application of binder the web is transferred to wire 24 and fed to dryer 50. Thereafter, the web is transferred to wire 26. At the transfer point C it is convenient to emboss the web with roll to roll or roll to wire embossing as is the case at A. Wire 26 conveys the web to a cure oven 52 for curing and finishing of the web which may be embossed at location D with either roll to roll or roll to wire embossing if so desired. The embossing process of the present invention is most preferably carried out at location A or at emboss station 40 prior to the application of binder. However, the sinuate pattern, or any other pattern for that matter, could be also applied at location B, C, or D or even after initial manufacture. The embossed rolls are located with their longitudinal axis perpendicular to the machine direction generally indicated by arrow 54 and may be located as rolls 56, 58 which are depicted in FIG. 1 and in FIG. 2. It shall be appreciated in connection with FIGS. 1 and 2 that the radially projecting sinuate bosses shown on roll 56 extend around the entire circumference of the roll and are aligned in the machine direction, or the direction of the travel of the web as it is produced. In this regard, arrow 54 is only a general indication of the machine direction but it should be readily apparent that the sinuate pattern extends continuously along the continuous web in the machine direction from the point of application of the emboss to the web as can also be seen in FIG. 3. The sinuate emboss pattern illustrated on the roll is thus in the direction perpendicular to the longitudinal axis of the emboss roll shown in FIG. 2.

There is shown in FIG. 2 diagrammatically the emboss rolls 56, 58 of FIG. 1. Patterned roll 56 is typically steel or maybe hard rubber while smooth emboss roll 58 maybe rubber or steel, soft or hard material. Roll 56 is provided with plurality of raised bosses 60 having a typical width 62 of 0.025 inches, a relief height 64 (which may also be referred to as depth) of typically of from about 0.015 to about 0.050 inches above the surface 66 of the roll between the sinuate bosses. The bosses are separated by a distance 68 of about 0.3 inches, have a wave amplitude 70 (peak to trough) of about 3.5 mils and a repeat frequency 72 of about 2 crests per inch. In operation rolls 56, 58 are loaded against one another under pressure with only the fibrous web separating them at location 40. It should be appreciated that the bosses at 60 are radially projecting and extend around the entire circumference of roll 56 to produce continuous compressed sinuate regions in the sheet so formed as can be seen in sheet 74 of FIG. 3. On FIG. 3 like numerals indicate similar parts as in FIG. 2. It should be noted that the dimensions of the bosses generally correspond to the dimensions on the sheet except in the case of the depth of the emboss which may or not have the same approximate dimensions on the sheet and roll. Thus, the repeat frequency 72, the line width 62, the wave amplitude 70, and the spacing of the lines 68 is approximately the same on sheet 74 as it is on roll 56 while the depth of the pattern on the sheet may depend upon both the height of the bosses and the basis weight of the web product. It is likewise to be appreciated that rolls 56 and 58 may be located at location A on FIG. 1. In such a case the compacted dry formed web 76 is fed between the rolls as shown in FIG. 3.

As noted above, the rolls are heavily loaded against one another and roll 56 is preferably heated to, or maintained at, a temperature of between 100° F. and 300° F. Passing between the rolls in what is termed roll to wire embossing wherein roll 58 engages the underside of the wire 78 as a support roll is shown in FIG. 3. The embossed sheet 74 is provided with the sinuate pattern of roll 56.

The particular pattern is conveniently provided to the emboss roll by laser engraving as is known in the art. It has been found that particular hardnesses in combination with the basis weights and the manufacturing of air-lay are particularly suitable for laser engraved hard rubber rolls. Typically the hard rubber surface is provided to the roll in the form of a sleeve 80 extending continuously around the roll which is applied in the form of a sheet, the various thicknesses of which are recited above, which is melt sealed at the seam. The roll is then engraved with any pattern so desired having the depths indicated herein. It should be noted that any suitable rubber having hardness properties suitable for engraving air-laid web may be employed, however, rubbers which give off noxious gases upon heating should be avoided. Typical rubbers which may be used include: nitrile rubbers, hypalon or suitable natural rubbers. Nitrile rubbers are particularly preferred in some applications.

The invention has been described in detail in numerous aspects and embodiments, further description being deemed unnecessary. Various modifications of specific embodiments within the spirit and scope of the present invention will be readily apparent to those who are skilled in the art. Such modifications are within the spirit and scope of the present invention as set forth in the appended claims.

What is claimed is:

1. A method of making an embossed air-laid absorbent sheet product comprising:
   depositing a dry web of fibers on a foraminous support;
   compacting the fiber web;
   embossing the compacted web with a laser-engraved roll with a hard rubber embossing surface, the hard rubber embossing surface having a plurality of sinuate bosses radially projecting circumferentially around the laser-engraved roll to provide the fiber web with a functional emboss pattern including a plurality of discrete, continuous sinuate compressed regions extending in a machine direction of the fiber web, the laser-engraved roll being heated to or maintained at a temperature of from about 100° F. to about 300° F.; and
   bonding the fiber web.

2. The method according to claim 1, wherein the hard rubber surface has a durometer hardness of from about 50 to about 100.

3. The method according to claim 2, wherein durometer hardness is from about 75 to about 100.

4. The method according to claim 3, wherein the durometer hardness is from about 85 to about 100.

5. The method according to claim 1, wherein the laser-engraved roll is heated to or maintained at a temperature of from about 200° F. to about 260° F.

6. The method according to claim 1, wherein the laser-engraved roll comprises a steel roll provided with a rubber sleeve of from about 1/32 inch to about 1 inch in thickness.

7. The method according to claim 1, wherein the plurality of continuous sinuate compressed regions have a width of from about 0.007 inches to about 0.060 inches.

8. The method according to claim 1, wherein the width is from about 0.015 inches to about 0.035 inches.

9. The method according to claim 1, wherein the plurality of sinuate compressed region are spaced at a distance from one another of from about 0.1 inches to about 1.0 inches.

10. The method according to claim 1, wherein the distance from one another is from about 0.2 inches to about 0.5 inches.

11. The method according to claim 1, wherein the plurality of continuous sinuate bosses have a height of from about 0.005 inches to about 0.125 inch.

12. The method according to claim 11, wherein the height is from about 0.010 inches to about 0.075 inches.

13. The method according to claim 12, wherein the height is from about 0.015 inches to about 0.05 inches.

14. The method according to claim 1, wherein the plurality of sinuate compressed regions have a wave amplitude of from about 1 millimeter to about 8 millimeters.

15. The method according to claim 14, wherein the wave amplitude is from about 2 millimeters to about 5 millimeters.

16. The method according to claim 15, wherein the plurality of sinuate compressed regions have a repeat frequency of from about 0.5 to about 4 wave crests per inch.

17. The method according to claim 16, wherein the repeat frequency is from about 1 to about 3 wave crests per inch.

18. The method according to claim 17, wherein the repeat frequency is about 2 wave crests per inch.

19. The method according to claim 1, wherein an emulsion binder is applied to the web after embossing.

20. The method according to claim 19, wherein the emulsion binder is applied to the web in an amount of from about 5 to about 35 weight percent based on the weight of dry binder and dry filler.

* * * * *